United States Patent
Fasolini et al.

(10) Patent No.: US 11,920,214 B2
(45) Date of Patent: Mar. 5, 2024

(54) PLANT AND METHOD FOR THE RECOVERY OF EXHAUSTED REFRACTORY MATERIAL

(71) Applicant: DEREF S.P.A., Genoa (IT)

(72) Inventors: Giorgio Fasolini, Cabella Ligure (IT); Marc Faverjon, Rapallo (IT)

(73) Assignee: DEREF S.P.A., Genoa (IT)

(*) Notice: Subject to any disclaimer, the term of this patent is extended or adjusted under 35 U.S.C. 154(b) by 200 days.

(21) Appl. No.: 16/311,555

(22) PCT Filed: Jun. 19, 2017

(86) PCT No.: PCT/IB2017/053628
§ 371 (c)(1),
(2) Date: Dec. 19, 2018

(87) PCT Pub. No.: WO2017/221130
PCT Pub. Date: Dec. 28, 2017

(65) Prior Publication Data
US 2019/0241992 A1 Aug. 8, 2019

(30) Foreign Application Priority Data

Jun. 20, 2016 (IT) .......................... UA2016A004528

(51) Int. Cl.
*C22B 34/00* (2006.01)
*B03B 9/04* (2006.01)
(Continued)

(52) U.S. Cl.
CPC ................ *C22B 34/00* (2013.01); *B03B 9/04* (2013.01); *B03B 9/065* (2013.01); *B07B 15/00* (2013.01);
(Continued)

(58) Field of Classification Search
CPC ........... C22B 34/00; C22B 1/005; B03B 9/04; B03B 9/065; B03B 9/06; B03B 9/061;
(Continued)

(56) References Cited

U.S. PATENT DOCUMENTS

| | | | | |
|---|---|---|---|---|
| 3,885,744 A | * | 5/1975 | Drage | B03B 9/061 241/23 |
| 3,905,556 A | * | 9/1975 | Drage | C22B 7/005 241/19 |
| 2009/0081093 A1 | * | 3/2009 | Comrie | B01D 53/508 422/177 |

FOREIGN PATENT DOCUMENTS

| | | | |
|---|---|---|---|
| DE | 19529208 A1 | 2/1997 | |
| DE | 10206834 A1 * | 8/2002 | ............... B03B 9/04 |

(Continued)

OTHER PUBLICATIONS

Georg Schons, "Device for treating Metal-Containing Composite Materials Comprises a Metal Separator Connected to an Impact Crusher, a Fluidized Stream Separator for Removing the Materials, and a Sieving Station for Iron/Non-Ferrous metals from the Slag", Aug. 2002, worldwide.espacenet.com (Year: 2002).*

(Continued)

*Primary Examiner* — Michael McCullough
*Assistant Examiner* — Molly K Devine
(74) *Attorney, Agent, or Firm* — Norris McLaughlin, P.A.

(57) ABSTRACT

Plants and methods recover spent refractory material and comprise at least one receiving area for said refractory material, at least one material sieving area, at least one magnetic separation area, and at least one sorting area. Said receiving area communicates with a first sieving area divides said refractory material in at least two fractions based on sizes of said refractory material. A second sieving area divides a fine fraction into at least two sub-fractions.

3 Claims, 2 Drawing Sheets

(51) Int. Cl.
- *B03B 9/06* (2006.01)
- *B07B 15/00* (2006.01)
- *C04B 33/138* (2006.01)
- *C04B 35/04* (2006.01)
- *C04B 35/06* (2006.01)
- *C04B 35/10* (2006.01)
- *C04B 35/622* (2006.01)
- *C22B 1/00* (2006.01)
- *C22B 7/04* (2006.01)

(52) U.S. Cl.
CPC .......... *C04B 33/138* (2013.01); *C04B 35/04* (2013.01); *C04B 35/06* (2013.01); *C04B 35/10* (2013.01); *C04B 35/62204* (2013.01); *C22B 1/005* (2013.01); *Y02P 10/20* (2015.11); *Y02P 40/60* (2015.11); *Y02W 30/52* (2015.05); *Y02W 30/58* (2015.05)

(58) Field of Classification Search
CPC ....... B07B 15/00; C04B 33/138; C04B 35/04; C04B 35/06; C04B 35/10; C04B 35/62204; Y02W 30/58; Y02W 30/52; Y02P 10/20; Y02P 40/60

USPC ......................................................... 209/38
See application file for complete search history.

(56) References Cited

FOREIGN PATENT DOCUMENTS

| DE | 10206834 A1 | 8/2002 |
| DE | 102008004477 A1 | 4/2009 |
| DE | 102012112093 A1 | 6/2014 |

OTHER PUBLICATIONS

Hanagiri; Seiji, "Recent Improvement of Recycling Technology for Refractories" (Jul. 2008), niponsteel.com, Nippon Steel Technical Report No. 98 (Year: 2008).*

International Search Report for corresponding application PCT/IB2017/053628 dated Sep. 7, 2017.

* cited by examiner

PLANT AND METHOD FOR THE RECOVERY OF EXHAUSTED REFRACTORY MATERIAL

The present invention relates to a plant and method for the recovery of exhausted refractory material in steel plants.

Particularly the plant of the present invention comprises at least one receiving area for the refractory material, at least one material sieving area, at least one magnetic separation area and at least one sorting area.

The one just described is the usual configuration of plants for the recovery of refractory material known in prior art.

Particularly the invention relates to recovery plants intended to recover refractories used in steelmaking cycle.

As it is known in prior art, steel is melted for being treated and, due to high temperatures involved, it is necessary to arrange refractory material linings in the several containers used in steelmaking, treatment and manufacturing processes.

The refractory material lining is interposed between the container metal structure and liquid steel contained therein, having a temperature exceeding 1500° C. By way of example said containers are: vessels of electric arc furnaces (EAFs), containers of converters (Vessel), ladles holding liquid steel for being transferred in the several plants.

Once all treatments on liquid steel are performed, refractory material linings of the containers are subjected to demolition.

Such demolition generates a considerable amount of scraps of which currently a small amount is recovered to be re-used in production processes, while most of them are landfilled.

It is clear how such process firstly causes a particularly severe environmental damage, as well as waste of resources, since it does not allow spent materials to be re-used, not only for making new container linings, but also for obtaining products to be re-used in steelmaking process.

Therefore there is an unsatisfied need for plants and methods known in prior art to provide a system allowing debris deriving from demolition of refractory material linings to be effectively recovered.

The present invention achieves the above objects by providing a plant for the recovery of spent refractory material as described above, wherein the receiving area communicates with a first sieving area comprising first sieving means intended to divide the refractory material into at least two fractions, a coarse fraction and a fine fraction, on the basis of the material size.

There is further provided a second sieving area comprising second sieving means intended to divide the fine fraction into at least two further sub-fractions on the basis of size thereof.

Such arrangement allows fine fraction to be treated which is generally discarded and directly landfilled.

In prior art known plants the fine fraction is not treated above all due to problems related to dust generation, not allowing the fraction to be subjected to dry treatment.

As it will be seen below from the description of one embodiment, and of the method of the present invention, a versatile plant is provided which, by the second sieving means, allows the same devices to be used for treating and recovering both coarse fraction and fine fraction.

Obviously the two fractions will be treated in different moments.

Moreover, as it will be described clearly below, the plant and method of the present invention allow the following to be obtained:

Basic granulate: raw material to be used both in melting process in the electric furnace and in the converter during the converting phase (partially replacing lime necessary for the process).

Metal fractions: metal material that can be re-introduced in the production cycle.

Aluminous granulate: refractory material intended to be used as raw material for producing products for steel industry.

The treatment carried out by the plant of the present invention advantageously does not involve chemical reactions between materials; it is only mechanical operations carried out at room temperature and pressure.

According to a preferred embodiment, the receiving area communicates with the first sieving area, that communicates with at least one material magnetic separation area.

There are further provided first transfer means intended to convey the coarse fraction to the sorting area, as well as second transfer means intended to convey the fine fraction to the second sieving area.

Transfer means can be any type: these can be conveyor belts or vehicles handled by operators within the plant.

Both coarse fraction and fine fraction can be subjected to further treatments downstream the magnetic separation area and the second sieving area respectively, treatments that will be disclosed with a particular reference to the method of the present invention.

It is important to point out how the following treatments, that will be described below and that are carried out on the coarse fraction and fine fraction, are downstream the first separation between coarse fraction and fine fraction.

Unlike prior art known systems the further division of the fine fraction takes place downstream the magnetic separation.

Such configuration allows dimensions of the plants and the treatment time to be optimized.

If the refractory material was immediately divided into fractions, it would be necessary to provide three long different treatment lines.

On the contrary by dividing the fine fraction downstream the magnetic separation, shorter treatment lines, as well as quicker and more efficient means for transferring the various materials are obtained.

Such solution is further advantageous if considering the fact that the coarse fraction is preferably reduced in dimensions such to be subjected to the same treatments the fine fraction is subjected to, optimizing material recovery.

The present invention further relates also to a method for the recovery of spent refractory material in steel plants.

It is specified that the method of the present invention can be carried out with the plant described above or with any other plant that allows treatments described by method steps to be carried out.

Particularly the method of the present invention comprises the following steps:
a) receiving the refractory material,
b) sieving and separating the refractory material
c) collecting the refractory material.

Particularly step b) provides the following sub-steps:
b1) first sieving of the material into at least two fractions on the basis of a first specific threshold size value, such to identify a fine fraction and a coarse fraction,
b2) magnetic separation of the fine fraction,
b3) magnetic separation of the coarse fraction,
b4) second sieving of the fine fraction into at least two sub-fractions on the basis of a second specific threshold size value.

As mentioned above, a treatment is provided also on the fine fraction, such to allow it to be recovered: such treatment is carried out after the magnetic separation of coarse fraction and fine fraction.

Besides advantages described above, such embodiment allows also dust generation to be limited.

The fine fraction and the coarse fraction are separated, but preferably they are treated by the same process and same equipment, but in different moments, obtaining a particularly versatile, effective and cheap system.

Particularly the fine fraction and/or coarse fraction are subjected to dry treatment, such to prevent the refractory material to be treated in a moist environment that may alter chemical-physical characteristics of the material.

According to a preferred variant embodiment of the method of the present invention, step b4) provides the fine fraction to be divided into three different sub-fractions, two second threshold size values being provided to be determined.

Such characteristic allows material recovery to be optimized, particularly the metal recovery: the fine fraction is divided in three different categories on the basis of size and specific and separate treatments are carried out for each category.

The smaller fractions contain a lower amount of metal, therefore metal recovery treatments will be focused on larger fractions.

Therefore advantageously according to an improvement, a step b5) is provided, after step b4), related to defining the two sub-fractions with greater size, there being further provided a step b6) for the nonmagnetic separation of sub-fractions with greater size, intended to separate nonmagnetic metal parts with respect to fine parts.

Such variant allows all the metal material to be recovered which was not recovered by the magnetic separation step carried out on the fine fraction.

It is clear how such variant embodiment can be used in plants providing to recover and/or use nonmagnetic material.

As it will be disclosed in details below, by showing some embodiments, fine parts are used for the production of basic granulate material.

According to a further embodiment of the method of the present invention there is provided a step before step a) and related to sorting the spent refractory material on the basis of the origin of said material.

Advantageously it is possible to separate the material to be treated on the basis of different specific characteristics of the origin plant or of the origin area of the plant (electric furnace vessels, converter containers, ladles.).

The steps of the method of the present invention therefore will be adapted on the basis of specific characteristics of materials that result from their different origins.

The separate treatment of refractory materials having common characteristics allows material recovery to be optimized.

Still with the aim of improving the recovery, also the coarse fraction can provide a treatment completely similar to fine fraction, therefore a separation thereof is provided in at least a magnetic metal part, at least a nonmagnetic metal part and at least a refractory part.

As it will be disclosed below even not suitable foreign parts and slag agglomerates will result from said separation.

According to an embodiment of the method of the present invention, the coarse fraction is at least partially divided into small granules.

Preferably it is the refractory part of such coarse fraction to be divided into granules.

Such granules are then used in fine fractions as granulate. It is specified that such granulates can be of the aluminous or basic type.

Finally according to a further variant embodiment, fine parts and/or coarse fraction, particularly the refractory part, are separated on the basis of their chemical-physical characteristics.

It is clear how this last chemical-physical separation gives to the method of the present invention a particularly advantageous aspect related to the differentiation of quality besides of quantity of the refractory material.

In the specific case of steel mills, such quality separation occurs by differentiating materials of the magnesic, dolomite and/or aluminous type.

Besides recovering such materials in a separate manner and not polluted by other materials, the plant and method of the present invention allow different treatments to be carried out differentiating both by quantity, fine fraction and coarse fraction, and by quality of both the fractions.

Finally the plant and the method of the present invention besides optimizing metal recovery, allow the process material consumption to be reduced, such as for example lime, by introducing in the process itself a part of the recovery material resulting from treatments disclosed above.

These and other characteristics and advantages of the present invention will be more clear from the following description of some embodiments shown in the annexed drawings wherein.

It is specified that figures annexed to the present patent application are shown in order to better define characteristics and advantages of the plant and method of the present invention.

Therefore such embodiments have to be intended by way of explanation and not as a limitation of the inventive concept of the present invention, that is to provide a plant and method for the recovery of refractory materials that allow the recovery of materials to be optimized, while limiting as much as possible waste products.

Figure 1:
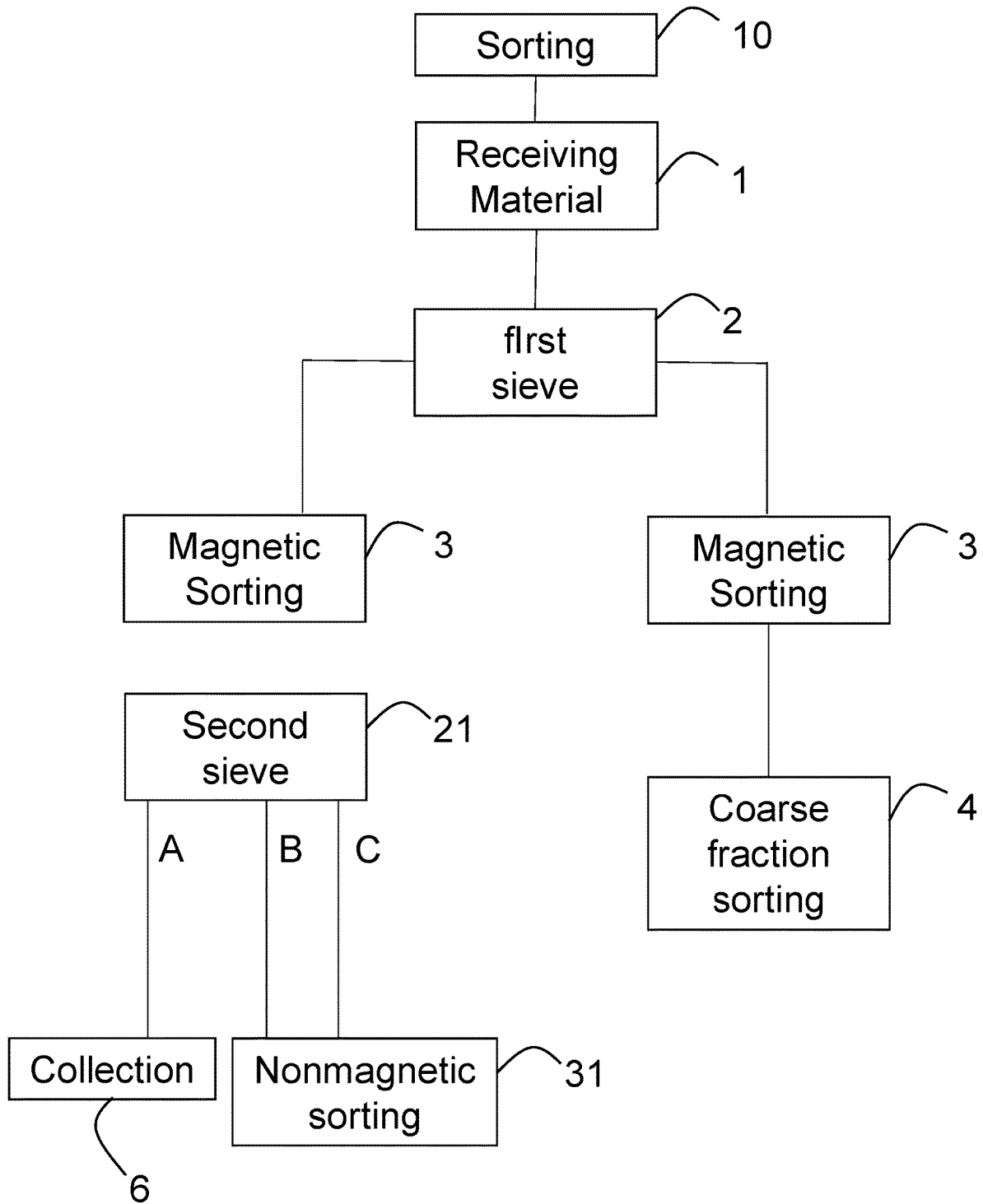
FIG. 1 is a schematic functional block diagram of the plant and method of the present invention according to a possible embodiment.

With particular reference to FIG. 1, the plant for the recovery of spent refractory material in steel plants, comprises at least one receiving area for the refractory material, at least one material sieving area 2, at least one magnetic separation area 3 and at least one sorting area 4.

Particularly the receiving area 11 communicates with a first sieving area 2 comprising first sieving means intended to divide the refractory material in at least two fractions, of which a coarse fraction and a fine fraction, based on material size.

There being further provided a second sieving area 21 comprising second sieving means intended to divide the fine fraction into at least two additional sub-fractions on the basis of size.

The first and second sieving means can be made according to any methods known in prior art.

For example they can be composed of vibrating screens having grids of specific dimensions intended to filter the material with larger size.

Assuming the pieces of refractory material to be as cubes, according to a preferred embodiment, such grids allow the material to be sorted such that the coarse fraction is composed of pieces with side larger than 50 mm and the fine fraction is composed of pieces with side smaller than 50 mm.

With particular reference to FIG. 1, it is specified that the functional path of coarse fraction is shown in the right side of the figure, while the one of the fine fraction is shown in the left side.

However these are merely functional diagrams, since both coarse fraction and fine fraction are preferably treated by the same equipment, as regards shared treatments.

Therefore the receiving area 11 communicates with the first sieving area 2 that communicates with at least one material magnetic separation area 3.

There are provided first transfer means intended to convey the coarse fraction in the sorting area 4 as well as second transport means intended to convey the fine fraction to the second sieving area 21.

On the basis of the characteristics of the plant outlined in FIG. 1, the refractory material is treated according to the following method steps:
- a) receiving the refractory material, area 1,
- b) sieving and separating the refractory material, areas 2, 21 and 3
- c) collecting the refractory material, area 4

The sieving and separating step provides the following sub-steps:
- b1) first sieving, denoted by 2, of the material into at least two fractions on the basis of a first specific threshold size value, such to identify a fine fraction and a coarse fraction,
- b2) magnetic separation of the fine fraction, denoted by 3
- b3) magnetic separation of the coarse fraction denoted by 3,
- b4) second sieving of the fine fraction into at least two sub-fractions on the basis of a second specific threshold size value, denoted by 21.

Particularly the fine fraction provides pieces with side smaller than 50 mm and upon the second sieving operation it is further divided into three sub-fractions by using two threshold values, 5 mm and 15 mm.

In this case therefore it will be possible to provide two grids, providing holes with side of 5 mm and side of 15 mm, such to form a fraction A of material with sides having a size from 0 to 5 mm, a fraction B with sides having a size of 5 to 15 mm and a fraction C with sides having a size from 15 to 50 mm.

As it is shown in FIG. 1, fractions B and C with larger size are identified and a nonmagnetic separation 31 is carried out, intended to separate nonmagnetic metal parts with respect to fine parts.

As it will be shown below the fine parts are used for the production of granulate products, while fraction A is stored inside suitable collection areas 6.

Since refractory material exhibits irregular shapes, it is possible to find fractions with one of the dimensions greater than 50 mm.

In this case it is possible to separate such pieces and to crush them such to perform the cycle described above with reference to fine fraction.

As an alternative or in combination it is possible to provide such pieces to be inserted into the cycle of the coarse fraction.

The coarse fraction, after magnetic separation, denoted by 3, is divided into at least one magnetic metal part, at least one nonmagnetic metal part and at least one refractory part, before being collected and stored.

According to a possible embodiment, the refractory part is at least partially divided into small granules, such to use such granules in combination with fine parts for producing basic or aluminous granulate materials.

Figure 2:
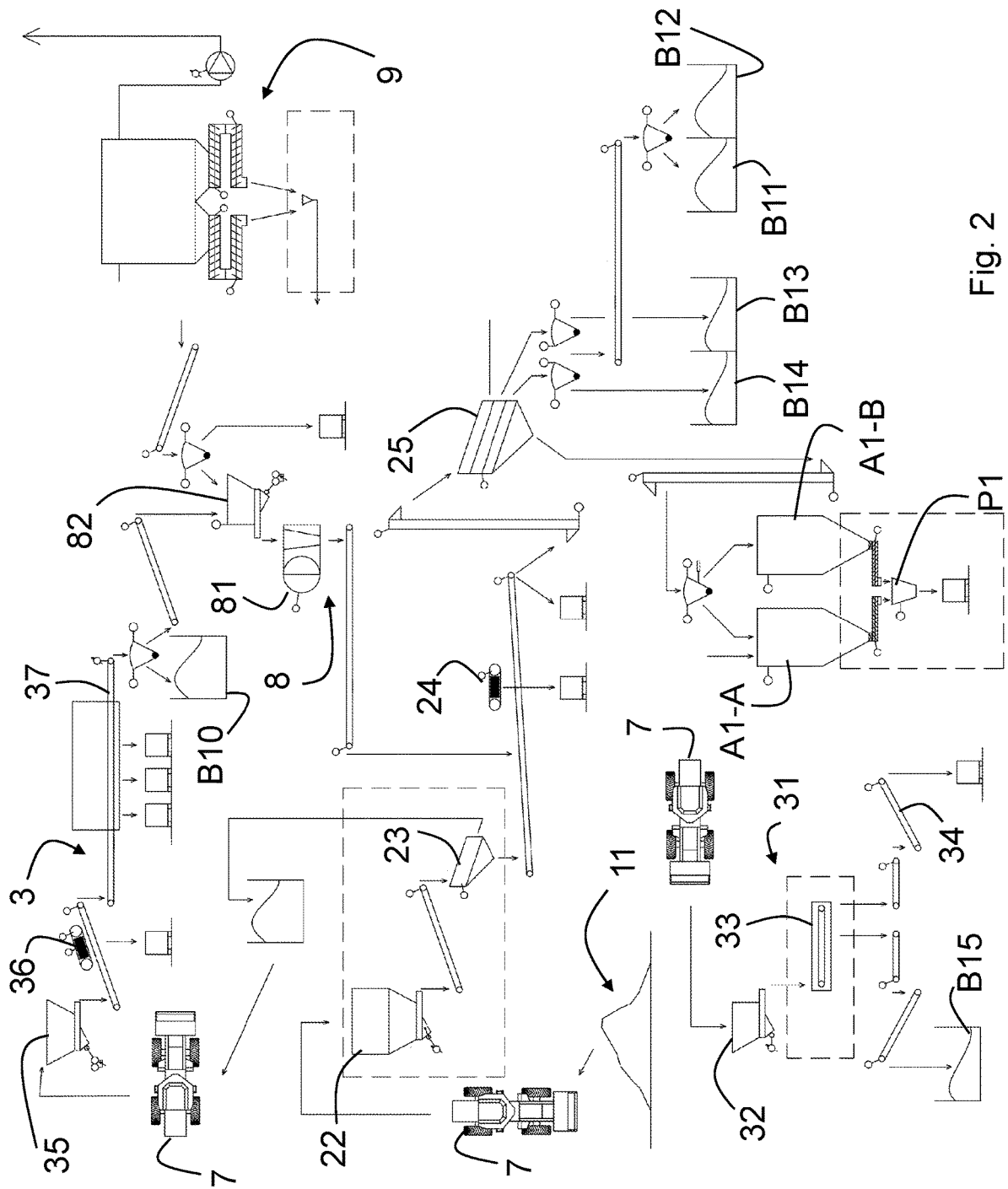
FIG. 2 is a schematic diagram of the plant and method of the present invention according to a further embodiment.

Moreover, such as described in details in FIG. 2, fine parts and/or the refractory part can be separated on the basis of their chemical-physical characteristics.

With a particular reference to FIG. 1, it is possible to provide a step 10, before receiving the material 1, and related to sorting the spent refractory material on the basis of the origin of said material.

FIG. 2 shows in more details and according to a possible embodiment the method and the plant described up to now and subject matter of the present invention.

On the basis of what shown in FIG. 2, refractory materials are received and taken at the receiving area denoted by 11.

As mentioned above, said materials are divided according to their origin. The discharge operation can be carried out from a motor vehicle, by a dumper or from the demolition area by being conveyed with excavator or wheel loader 7.

Before the first sieving area 2 it is possible to provide to remove metal parts and agglomerates having metric and decimetric size with the help of an excavator or a loader. Such removal can be obtained manually by visually checking the material.

Then the sieving action is carried out, denoted by 2, which is performed at the beginning of the treatment with a twofold aim of separating the fine fraction and of obtaining a coarse fraction, with a size greater than 50 mm, free from fine material in order to facilitate the following sorting step.

Advantageously materials are filtered by batches that correspond to a specific origin.

The screening (or sieving) is carried out by using the automatic plant arranged in the relevant position.

Materials fed with a wheel loader 7 in the hopper 22 are conveyed to a primary sieve 23 from where fine fraction results, preferably with size smaller than 50 mm, intended to be sorted.

The fine fraction is subjected to iron removal by means of overband magnetic separator 24 and then conveyed to the sieve 25 where preferably the following grain size fractions are obtained: 0/5 mm-mm and 15/50 mm.

5/15 and 15/50 mm fractions, intended for being subjected to nonmagnetic separation, are stored in box B13 and B14.

The 0/5 mm fraction is conveyed to storage silos A1-A and A1-B for "Dolomite" or "Magnesic" material respectively.

The nonmagnetic separation, denoted by 31, provides the 5/15 mm and 15/50 mm fractions resulting from the sieving process described above, to be mechanically treated such to separate the nonmagnetic metal parts present therein that have not been previously sorted by the magnetic separation.

Nonmagnetic separation is carried out alternatively on 5/15 mm and 15/50 mm fractions on an automatic and independent treatment line.

Materials to be treated are introduced in the hopper 32 from where they are conveyed to the inductive separator 33. The metal fraction is discharged from the belt 34 into a bin 35, the inert fraction is stored in box B15.

5/15 mm and 15/50 mm fractions are intended for production of 5/50 mm basic granulates. These are transferred by the wheel loader 7 in boxes B11 and B12, for "Dolomite" and "Magnesic" materials respectively.

In order to limit dust generation during the treatments on fine fraction, it is possible to provide a dust collecting plant, denoted by numeral 9 in FIG. 2.

The coarse fraction deriving from screening or sieving process 2 is composed of refractory materials of different qualities used in the several refractory constructions, generally bricks or parts thereof.

Such materials are subjected to a sorting operation, denoted by 3, such to separate:
1. Magnetic metal parts
2. Nonmagnetic metal parts
3. Aluminous refractories
4. Spinel refractories
5. Slag agglomerates
6. Non suitable foreign parts, if any
7. Basic refractories Materials having a grain size greater than 50 mm are loaded in the bin 35 by the wheel loader 7 by batch corresponding to their origin. The magnetic sorting operation, if carried out in line with grinding operation, denoted by 8, is performed based on "magnesic" or "dolomite" material.

Separation of magnetic metal parts is carried out by the overband separator 36.

Magnesic or dolomite basic refractory parts correspond to the part remaining after the sorting process.

All the other fractions are sorted by the operators on the sorting belt 37.

Positively sorted fractions are collected in metal bins that then are discharged in corresponding storage boxes.

Basic fractions are collected in box B10 or directly sent to grinding, denoted by 8.

Grinding operation acts for producing basic granulates of ⅗ mm and ⁵⁄₅₀ mm with the basic fraction larger than 50 mm being sorted. It is carried out on the basis of "magnesic" or "dolomite" material.

The production of such granulates is carried out in a suitable jaw crusher 81 recirculating on vibrating screen with 3 grids.

The ⅗ mm fraction is conveyed to storage silos.

⁵⁄₁₅ mm and ¹⁵⁄₅₀ mm fractions are conveyed together to boxes B11 or B12 depending on the quality of the produced material.

The feeding to grinding operation is carried out in line with sorting operation in hopper 82.

According to the embodiment shown in FIG. 2 it is possible to provide to package dolomite or magnesic basic granulates, corresponding to fraction A of FIG. 1.

Such products are packed in bags on pallet such to be used in the electric furnace as slag conditioner.

Packaging is carried out by the automatic plant P1 being charged under silos A1-A and A1-B.

As described above, finished products are stored in suitable boxes, for bulk material and in warehouse area in bags waiting for being shipped and being reused.

The products obtained can be summarized as:
dolomite granulate ⁵⁄₅₀ mm/bulk
magnesic granulate ⁵⁄₅₀ mm/bulk
dolomite granulate ⅗ mm/big bag
magnesic granulate ⅗ mm/big bag
nonmagnetic steel/bulk
magnetic steel/bulk
aluminous materials/bulk
aluminous materials: spinel/bulk
slag/bulk
waste/bulk

The invention claimed is:

1. A method for recovering spent refractory material in one or more steel plants and reusing finished product of recovered spent refractory material, the method comprising the following steps:
   a) receiving refractory material coming from demolition of refractory material linings in containers used in steel making, treatment and manufacturing processes, wherein the refractory material includes basic refractory parts comprising at least one of magnesic material and dolomite material,
   b) sieving and separating the refractory material, and
   c) collecting the refractory material,
   wherein
   step b) comprises the following sub-steps:
      b1) first sieving of the refractory material into at least two fractions on the basis of a first specific threshold size value, so as to identify a fine fraction and a coarse fraction,
      b2) magnetically separating the fine fraction, and
      b3) magnetically separating the coarse fraction into at least one of a magnetic metal part, a nonmagnetic metal part, and a refractory part, and wherein said coarse fraction is fragmented into small granules,
      b4) second sieving of the fine fraction into three different sub-fractions on the basis of two second specific threshold size values,
      b5) identifying two sub-fractions with greater size, and
      b6) nonmagenetically separating the two sub-fractions with greater size such that nonmagnetic metal parts are separated with respect to fine parts,
      b7) producing basic granulate materials as a finished product by a grinding operation of the small granules in combination with said fine parts, wherein the basic granulate materials consist of raw material usable in a melting process in an electric furnace; and
      b8) partially replacing lime necessary for the melting process in the electric furnace by disposing slag conditioner into the electric furnace, wherein slag conditioner comprises the raw material of the basic granulate materials.

2. The method according to claim 1, wherein
   the fine parts and/or the coarse fraction are separated on the basis of at least one of chemical properties of the coarse fraction and physical properties of the coarse fraction.

3. The method according to claim 1, wherein
   an initial step, before step a), comprises sorting spent refractory material according to origin of said material.

* * * * *